United States Patent [19]

Meynier

[11] Patent Number: 4,790,413

[45] Date of Patent: Dec. 13, 1988

[54] MULTIPLE DISC BRAKE

[75] Inventor: Guy Meynier, Aulnay-sous-Bois, France

[73] Assignee: Bendix France, Drancy, France

[21] Appl. No.: 111,737

[22] Filed: Oct. 21, 1987

[30] Foreign Application Priority Data

Oct. 29, 1986 [FR] France ................ 8615045

[51] Int. Cl.$^4$ .................... F16D 65/12
[52] U.S. Cl. .................... 188/18 A; 188/71.5; 188/218 A; 192/70.17; 192/70.19; 192/30 V
[58] Field of Search ............ 188/71.5, 73.38, 71.1, 188/73.43, 205 A, 218 A, 18 A, 218 XL; 192/70.16, 70.17, 70.18, 70.19, 70.2, 30 V

[56] References Cited

U.S. PATENT DOCUMENTS

| | | | |
|---|---|---|---|
| 1,467,732 | 9/1923 | Litle, Jr. .................. | 192/70.2 X |
| 3,994,378 | 11/1976 | Schwabe et al. ............ | 188/71.5 X |
| 4,463,837 | 8/1984 | Courbot .................... | 188/73.38 |
| 4,480,736 | 11/1984 | Loizeau ..................... | 192/70.17 X |
| 4,576,255 | 3/1985 | Méry et al. ................. | 188/71.5 |
| 4,576,257 | 3/1986 | Carre et al. ................ | 188/73.38 X |
| 4,598,799 | 7/1986 | Thioux ...................... | 188/71.5 |
| 4,606,436 | 8/1986 | Méry et al. ................. | 188/71.5 X |
| 4,614,254 | 9/1986 | Méry et al. ................. | 188/71.5 |

FOREIGN PATENT DOCUMENTS

| | | |
|---|---|---|
| 130883 | 1/1985 | European Pat. Off. . |
| 143709 | 6/1985 | European Pat. Off. . |
| 1205345 | 11/1965 | Fed. Rep. of Germany . |
| 1374262 | 4/1964 | France . |
| 2138312 | 5/1973 | France . |
| 1087988 | 10/1967 | United Kingdom . |

Primary Examiner—George E. A. Halvosa
Attorney, Agent, or Firm—Larry J. Palguta; Ken C. Decker

[57] ABSTRACT

Multiple disc brake comprising a first rotary disc fixed to a hub connected to a rotating member to be braked and at least one second rotary disc capable of sliding axially relative to the hub and to the first disc, while at the same time being made integral in terms of rotation with the first disc. The connection between the second disc (2) and the hub (3) is made by way of at least two axially sliding shoes (22) which are uniformly distributed over a circle and which are each accommodated in an axial receptacle (23) of a cross-section matching that of the shoe (22). The invention is used on a multiple disc brake for motor vehicles.

7 Claims, 2 Drawing Sheets

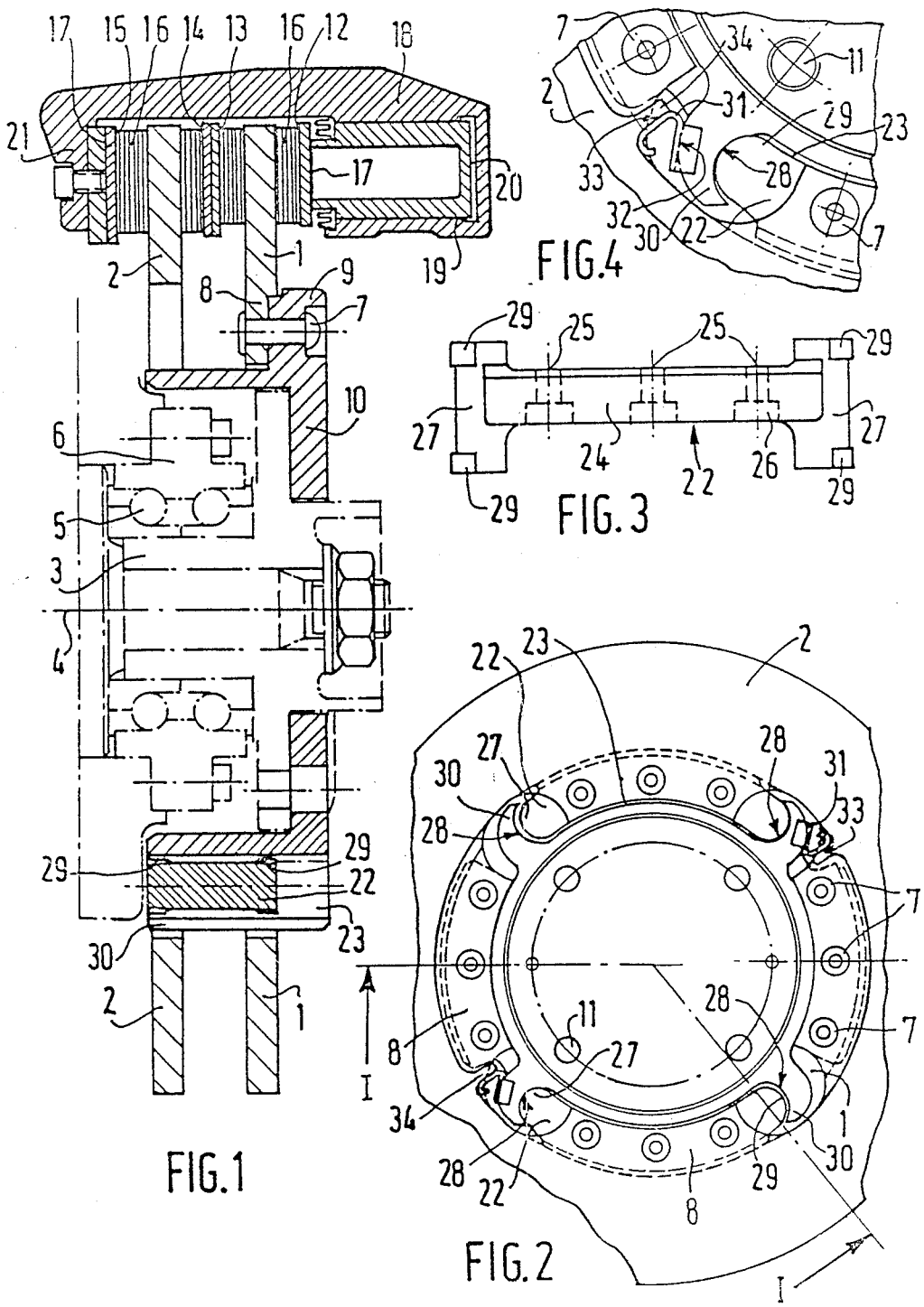

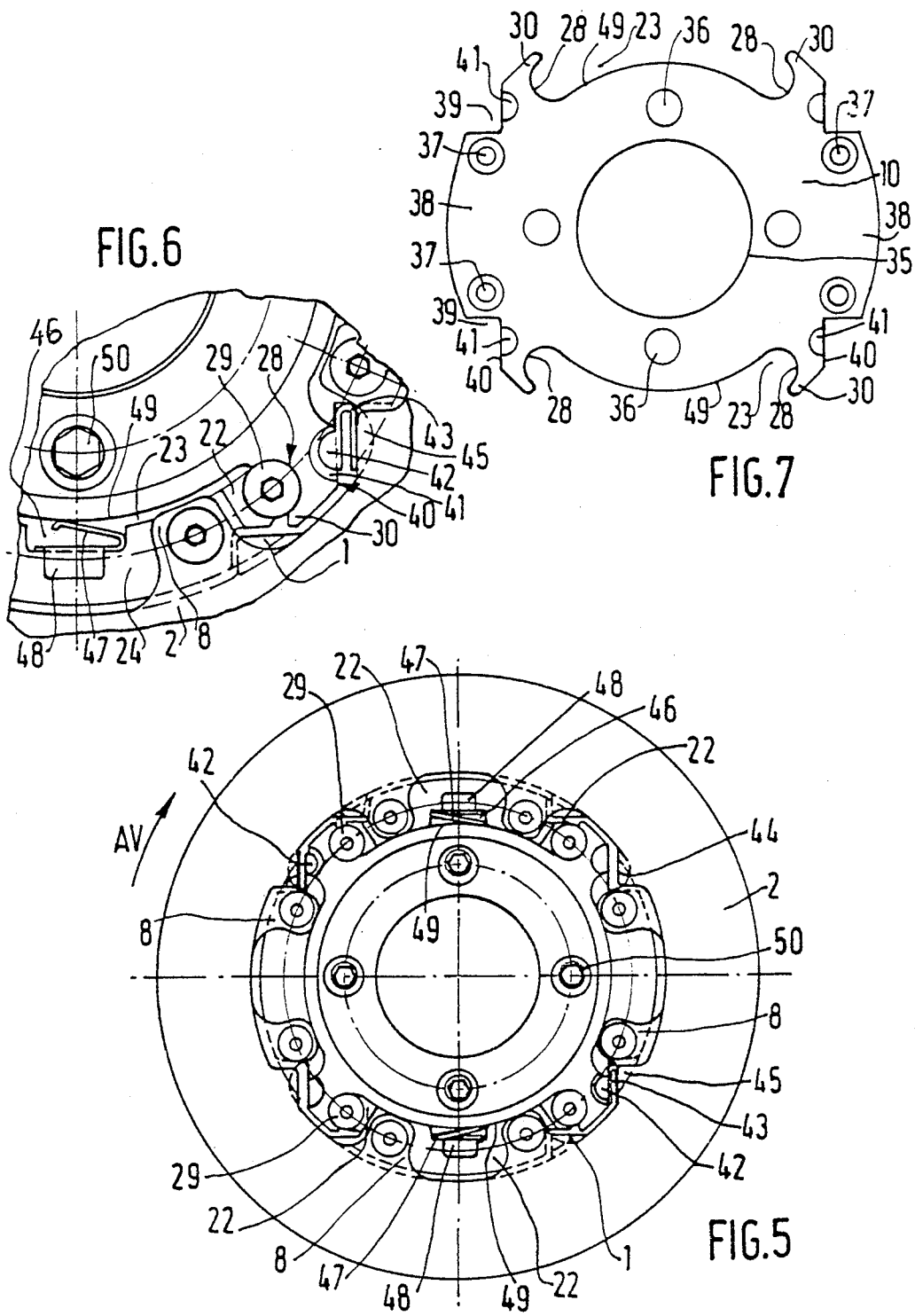

MULTIPLE DISC BRAKE

The invention relates to a multiple disc brake comprising a first rotary disc fixed to a hub connected to a rotating member to be braked and at least one second rotary disc capable of sliding axially relative to the hub and to the first disc, while at the same time being made integral in terms of rotation with the first disc, the axes of the hub and of the discs coinciding with one another, and a set of friction shoes having friction linings capable of being laid against the faces of the discs by means of an actuating device.

The document EP-A No. 130883 already makes known a multiple disc brake of this type, in which the second disc is carried by an internally splined sleeve which can slide on part of the externally splined hub, the mutual engagement of these splines ensuring that the second disc is driven in rotation by the hub. To reduce the effects of the play which inevitably exists between the splines of the sleeve and of the hub and which can give rise to rattling caused when the flanks of the splines abruptly come in contact with one another, during braking these splines working to transmit the deceleration torque of the second disc to the hub, it was proposed to provide an arrangement which generates, between the sleeve and the hub, a torque stressing them about their common axis in such a direction that it tends to bring up against one another the flanks of the splines of the hub under the sleeve, via which the braking force is transmitted to the hub. The torque-generating arrangement comprises at least one elastic element, for example a rubber block expanded within a receptacle by means of an inner pin.

Such a prestressing of the splines made it possible to prevent the rattling between flanks at the moment when the brake was applied and if the braking direction was reversed. On the other hand, during long-term tests, it became clear that either the elastic element gradually lost its elasticity or some of the splines tended to seize because they had remained too long in the same position under vibration, the second rotary disc then no longer sliding relative to the first in a truly free manner. After a long operating time, these faults resulted in abnormal wear of some friction tracks of the discs and some of the friction blocks and in variations in the braking torque of the discs.

It is therefore an object of the invention specifically to provide a multiple disc brake, the second disc of which has a movability relative to the first disc and to the hub which is both greater and less sensitive to heating and which is maintained to a greater extent over a period of time, since it makes use of shoes which are relatively floating and which are mounted with play in a receptacle. Another object of the invention is to obtain this high movability of the second disc with compact means easy to use, to ensure economical large-scale production.

To achieve this, according to the invention, the connection between the second disc and the hub is made by means of at least two axially sliding shoes which are uniformly distributed over a circle and which are each accommodated in an axial receptacle of a cross-section matching that of the shoe. The shoes are fixed to the inner periphery of the second disc and/or the outer periphery of a flange part, itself fixed to the hub, and the axial receptacles are conversely provided on the outer periphery of the flange part fixed to the hub and/or on the inner periphery of the second disc and have, on the one hand, lateral stop flanks with a slight play for transmitting the retaining torque of the second disc to the hub and, on the other hand, at least one means of radial retention of the shoes. The means of radial retention preferably consists of one edge of the lateral flank which projects into the receptacle and which closes over the corresponding shoe in order to retain it at least in one of its radial directions of movement.

According to another embodiment of the invention, each shoe has at least one convex rounded end which interacts with a corresponding concave rounded lateral flank of the receptacle, the outer edge of this concave lateral flank closing over the convex end of the shoe, in order to trap the latter radially in the receptacle, with a tangential play allowing it to execute small radial and rotational movements and axial sliding for the purpose of bringing the friction tracks of the second disc in contact with the corresponding friction linings.

According to yet another embodiment of the invention, tending to eliminate the rattling which occurs at the moment when the brake is applied, at least one playcompensating spring is interposed between the second disc and the hub and/or between the sliding shoe and its receptacle.

The flange part fixed to the hub advantageously has outer peripheral tongues, to which inner peripheral tongues integral with the first disc are fastened laterally, at least two outwardly open receptacles being formed between the outer peripheral tongues of the flange part, so that each receives a sliding shoe fixed to the second disc.

According to an embodiment which considerably reduces the production costs of the discs, the first disc and the second disc are identical and interchangeable at assembly and on their inner periphery have fastening lugs uniformly distributed and intended to be fastened, for example, by means of rivets, to the peripheral tongues of the connecting flange or to the central part of a shoe respectively.

Each sliding shoe preferably has a central part of less thickness, designed to be fastened laterally to at least one inner peripheral lug of a brake disc, and peripheral parts of general cylindrical shape, which are connected to the central part and which are equipped at their two ends, on the same side as the recessed ends of the receptacles receiving them, with at least one bearing surface projecting relative to the general cylindrical shape and intended to come up against the said recessed end of the receptacle.

According to a special embodiment of the multiple disc brake according to the invention, at least one play-compensating spring is interposed between a supporting surface provided on the outer periphery of the connecting flange and a matching supporting surface formed on the inner periphery of the second disc. At least one of the supporting surfaces provided on the connecting flange or on the inner periphery of the second disc is inclined relative to a radial direction, so as to produce a reaction with a radial component and with a tangential component. The compensating spring is advantageously a leaf spring bent in the form of a U and equipped with two substantially semi-cylindrical retaining lugs turned down perpendicularly to the spring leaf and, during operation, accommodated in substantially semi-cylindrical receptacles formed on the side of one of the supporting surfaces of the flange part.

According to another embodiment having springs for eliminating the rattling occurring when the brake is applied, the shoe has, in its part facing the bottom of the receptacle, a surface for supporting and guiding the spring and a recessed spring receptacle, in which a playcompensating spring of the shoe is arranged and which is interposed between the said surface for supporting and guiding the spring and a spring stop surface formed by the bottom surface of the receptacle.

The invention will now be described by way of example with reference to the accompanying drawings in which:

FIG. 1 shows a first embodiment of the multiple disc brake according to the invention in axial section in a plane along the line I-I in FIG. 2;

FIG. 2-shows an end view, with portions cut away, of the brake discs and of the connecting flange according to the embodiment illustrated in FIG. 1;

FIG. 3 is a plan view, on a larger scale, of one of the shoes connecting the second disc to the flange of the hub;

FIG. 4 is a fragmentary view, on an even larger scale, showing the zone of a play-compensating spring corresponding to FIG. 2;

FIG. 5 is a complete end view, substantially on the same scale as in FIG. 2, of another embodiment of the brake discs connected to a hub flange;

FIG. 6 is a fragmentary view, on a larger scale, of the zone of the play-compensating springs in FIG. 5;

FIG. 7 shows an end view of the flange connecting the hub to the first disc and to the sliding shoes carried by the second disc, in the embodiment shown in FIG. 5.

The multiple disc brake illustrated in FIG. 1 comprises a first rotary disc 1 and a second rotary disc 2 which are fixed to a hub 3, the axis 4 of which coincides with those of the discs 1 and 2. The hub 3, like the other components which are not part of the actual brake, is represented by dot-and-dash lines and rotates on a ball bearing 5 mounted inside a stationary ring 6. The disc 1 is fixed to the hub 3 by means of a ring of rivets 7 connecting tongue-shaped inner parts 8 of this disc and matching outer tongues 9 of an intermediate flange 10 fixed to the hub 3 by means of screws not shown in FIG. 1 (see the bores 11 in FIG. 2). The disc 1 is thus stationary in the direction of the axis 4, while the disc 2 can move in this direction by sliding means described later.

Each brake disc 1 or 2 interacts with a pair of friction blocks 12 and 13 or 14 and 15 which are arranged on either side of the corresponding brake disc 1 or 2 and which are capable of being laid against the lateral faces of the latter. Each of these friction blocks 12, 13, 14 and 15 comprises a friction lining 16 and a lining-holder plate 17, each lining 16 interacting with the corresponding adjacent face (of the disc 1 or 2) forming a friction track.

A stirrup 18 is fastened to the stationary ring 6 by means of connections (not shown) and is arranged over the brake discs 1, 2 and their friction blocks 12, 13, 14, 15, so as to cover the disc/block assembly. In the inner part 19 of the stirrup 18 there is a control motor, such as a hydraulic jack, the piston 20 of which is capable of acting on the lining-holder plate 17 of the inner block 12 and, as a result of reaction and by means of the curved nose 21 of the stirrup, on the lining-holder plate 17 of the outer block 15, in order to control the clamping of the disc-block assembly in the direction of the axis 4 and thus generate the braking friction between each lining 16 and the friction track of the associated disc.

This action can be accompanied by a movement of the second disc 2 parallel to the axis 4 in relation to the hub 3. For this purpose, whereas the first disc 1 is connected rigidly to the intermediate flange 10 by means of the rivets 7, the connection between the second disc 2 and the intermediate flange 10 fixed to the hub 3 is made by means of two shoes 22 which slide axially in an axial receptacle 23 of a cross-section matching that of the shoe (see also FIG. 7). The two shoes 22 are arranged symmetrically relative to the center of the intermediate flange 10 and therefore of the hub 3 and are thus distributed uniformly on the periphery of this flange, at the same time having a general arched shape with rounded convex ends. The plan view in FIG. 3 shows that the shoe 22 has a thinner central part 24, in which there are three bores 25 equipped with a countersinking 26 serving for embedding the head of the fastening rivet (not shown), in principle identical to the rivet 7 fastening the disc 1 to the flange 10. The central part 24 is connected to ends 27 of general cylindrical shape, the axis of the cylinder being parallel to the axis 4 of the hub. Here, on the outside, that is to say on the same side as the flanks 28 of the receptacle 23 during operation, the ends 27 have projecting bearing surfaces 29 intended for coming in contact with these flanks 28. These projecting bearing surfaces can be attached by any means, such as welding or the screw-fastening of a cylindrical endpiece or be produced integrally with the shoe by casting or forging.

FIGS. 2 and 4 to 7 show that the lateral flanks 28 of the receptacles 23 have, in cross-section, a rounded concave shape of a diameter slightly greater than that of the ends 27, 29 of the shoes, with, at the end of the receptacle, a sort of edge or toe 30 which projects towards the inside of the receptacle 23 and which closes over the end 27, 29 of the shoe, in order to retain the latter radially. The function of the radial retention of the shoe 22 by the end 30 is shown clearly in the lower part of FIG. 1, where it can be seen that the receptacle 23 in fact forms an axial groove which guides the shoe 22 during the axial movement of the second disc 2 in relation to the hub 3.

The shoe 22 is mounted with a slight radial and, above all, tangential play inside its receptacle 23, to allow the shoe to expand freely during the heating of the second disc 2 and produce a slight flapping movement whenever the brakes are applied, so as to dislodge the particles of dirt which could accumulate during the operation of the brakes. To prevent the shoes 22 from rattling when they come in lateral contact with the receptacle 23, play-compensating springs 31 in the shape of a leaf bent in the form of a V are interposed between the inclined back 32 (see FIG. 4) of the projecting toes 30 and a supporting surface 33 of an inner radial toe 34 of the second disc 2.

FIGS. 2 and 5 show that the first and second discs 1, 2 are identical, each having inner tongues 8 which, where the disc 1 is concerned, are fastened directly to the flange 10 by means of rivets 7 and, where the disc 2 is concerned, are fastened to the shoes 22 by means of identical rivets. The two discs are equipped with toes 34 which serve as a spring stop for the second disc 2 only. In the embodiment of the invention illustrated, there is therefore no need to provide two types of discs 1 and 2.

In the type of connecting flange illustrated in FIG. 7, it will be seen that there is a central bore 35 which is intended for receiving the hub 3 and which is surrounded by a ring of holes 36 for fastening it to this hub 3. Countersunk holes 37 are made in lugs 38 projecting between the receptacles 23, for receiving countersunk-head screws for fastening the first disc 1. The connecting flange illustrated in FIG. 7 corresponds to the embodiment shown in FIG. 5, which has only two screws for fastening the shoe. In this embodiment, spring-receiving orifices 39 are made (or cut) between the toe 30 of the end 28 of the receptacle 23 and the lugs 38. Receptacles (or half-countersinks) 41 open onto one of the faces 40 of this receptacle 39 and are intended for the turned-down lugs 42 (see FIGS. 5 and 6) of a play-compensating spring 43 interposed between an inclined stop surface 44 formed on an inner toe 45 of the disc 2 and the face 40.

In the embodiment illustrated in FIGS. 5 to 7, the shoes 22 have a central recess 46 forming a receptacle for a leaf spring 47 bent in the form of a U and having lugs 48 turned down round a guide surface for the shoe 22. One of the branches of the U of the spring 47 is up against the bottom of the central recess 46, while the other branch is up against the bottom 49 of the receptacle 23. The screws 50 for fastening the connecting flange 10 to the hub 3 pass through the holes 36 and are shown in an end view in FIG. 5.

The mode of operation of the multiple disc brake just described will now be explained. When the brakes are applied, the piston 20 pushes the plate 17 and the corresponding lining 16 into contact with the first friction track of the first disc 1, and the brake pressure prevailing in the inner part 19 pulls the stirrup 18 so as to bring the nose 21 in contact with the plate 17 of the outer block 15, so that its brake lining 16 is brought in contact with one of the friction tracks of the second disc 2. The latter, under the pressure of the friction lining 16 of the block, slides axially relative to the intermediate flange 10, at the same time driving the shoes 22 in a translational movement in their corresponding receptacles 23, until all the friction linings 16 are in contact with the friction tracks of the discs 1 and 2.

At the moment when the friction linings 16 are laid against the two friction tracks of the second disc 2, the shoes 22 can move axially in their receptacles 23, since the braking torque is not yet exerted on the second disc 2 and the tangential force exerted by the convex ends 27 of the shoes 22 on the concave ends 28 of the receptacles 23 is sufficiently low to allow the shoe 22 to slide in its receptacle, even without any lubrication of the surfaces in contact. As soon as the braking torque has a retaining action on the second disc 2, the tangential force exerted on the shoes 22 allows the latter to ensure, along generatrices two widened lines of contact between the two cylindrical surfaces of the bearings 29 and of the concave end 28 of the receptacle 23.

After the brakes have been released, there is a slight tangential movement of the shoes 22 which tends to repel or dislodge the dirt which could have settled in the gaps between the shoe 22 and its receptacle 23. If the braking torque is exerted in the opposite direction to the usual direction (represented by AV in FIG. 5), for example during the reversing of a motor vehicle, the shoes 22 move tangentially, at the same time slightly compressing the interposed springs 31 or 43 for compensating the tangential play and via their bearing surface 29 come up against the concave end 28 of the receptacle 23 which is opposite that serving as a support in the preferred direction.

The guide and sliding surfaces consisting of receptacles 23 and the shoes 22 form tangential couplings which are designed to transmit high torques and which have low sensitivity to differential heating. This differential heating can occur if, during braking, the shoes 22 are heated from their zone of contact with the second disc 2, whereas the intermediate flange 10 is relatively cold, thus tending to cause tilting and twisting of the shoes 22. The correct bearing of the bearing surfaces 29 of the convex ends 27 of the shoes 22 on the concave ends 28 of the receptacles 23 is always ensured, despite this twisting and this tilting, since the bearing of the shoes tends to spread round two short concave/convex lines of contact between two cylinders.

It will be noted that it is possible to provide the receptacles 23 in an inner ring which would be attached to the inside of the second disc 2 or would be an integral part of this second disc, the shoes 22 then being fixed to the intermediate flange 10. It is also possible to combine these two solutions by using at the same time shoes fixed to the second disc 2 and other shoes fixed to the intermediate flange 10, all these shoes interacting with corresponding receptacles suitably arranged on the intermediate flange 10 and the second disc 2.

Although the above-described method of coupling with high axial movability and with a high torque transmission capacity is capable of functioning for a long time without any special protection, at the same time withstanding thermal shocks, to improve the axial movability of the second disc 2 in relation to the hub 3 it is possible to close the coupling zone of the shoes 22 and of the intermediate flange 10 by means of flexible, leak-proof, annular diaphragms and fill the closed space thus delimited with grease preferably resistant to heating, for example silicone grease.

Of course, the present invention is not limited to the embodiments described and illustrated and is capable of having many alternative forms accessible to a person skilled in the art, without thereby departing from the spirit of the invention.

I claim:

1. A multiple disc brake comprising a first rotary disc fixed to a hub connected to a rotating member to be braked and at least one second rotary disc capable of sliding axially relative to the hub and to the first disc while at the same time being integral in terms of rotation with the first rotary disc, the axes of the hub and of the discs coinciding with one another, and a set of friction blocks having friction linings capable of being laid against faces of the disc by means of an actuating device, characterized in that a connection between the second rotary disc and the hub is made by means of at least two axially sliding shoes which are uniformly distributed about the hub and which are each accommodated in an axial receptacle of a cross-section matching that of the shoe, the shoes fixed to one of the inner periphery of the second rotary disc and the outer periphery of a flange part fixed to the hub, and the axial receptacles provided conversely on one of the outer periphery of the flange part fixed to the hub and the inner periphery of the second rotary disc, the axial receptacles including radially spaced open and closed sides and having concave rounded lateral stop flanks for transmitting retaining torque of the second rotary disc to the hub and means for radial retention of the shoes, the radial retention means comprising one edge of a respective lateral stop flank which projects into the open side of the receptacle and which closes over the corresponding shoe in order to retain the shoe at least in one radial direction of movement, each shoe having at least one convex rounded end which interacts with an associated concave rounded lateral stop flank of the receptacle, an outer edge of the associated concave rounded lateral stop flank closing over the convex rounded end of the shoe in order to trap the shoe radially in the receptacle with a tangential play allowing the shoe to execute small radial and rotational movements and axial sliding to bring the second disc into contact with the associated friction linings, at least one play-compensating spring interposed at one of between the second rotary disc and hub and between a sliding shoe and associated receptacle, and the flange part fixed to the hub having outer peripheral tongues to which inner peripheral tongues integral with the first rotary disc are fastened laterally, the axial receptacles being disposed between the outer peripheral tongues of the flange part, so that each receptacle receives a sliding shoe fixed to the secondary rotary disc.

2. The multiple disc brake according to claim 1, characterized in that each shoe has, in a part facing a bottom surface of the receptacle, a surface for supporting and guiding a spring and a recessed spring receptacle in which the play-compensating spring of the shoe is arranged and which is interposed between the surface for supporting and guiding the spring and a spring stop surface formed by the bottom surface of the receptacle.

3. The multiple disc brake according to claim 1, characterized in that the first and second rotary discs are identical and interchangeable at assembly and at inner peripheries have inner peripheral tongues uniformly distributed and for fastening to one of the peripheral tongues of the flange part and a central part of a shoe, respectively.

4. The multiple disc brake according to claim 3, characterized in that the central part of each sliding shoe has less thickness, is designed to be fastened laterally to at least one inner peripheral tongue of a brake disc, and has peripheral parts of general cylindrical shape which are connected to the central part and which are equipped at respective ends, on the same side as recessed ends of the receptacles, with at least one bearing surface projecting relative to the respective general cylindrical shape and intended to engage the associated recessed end of the receptacle.

5. The multiple disc brake according to claim 4, characterized in that one play-compensating spring is interposed between a supporting surface provided on the outer periphery of the flange part and a matching supporting surface formed on the inner periphery of the second rotary disc.

6. The multiple disc brake according to claim 5, characterized in that at least one of the supporting surfaces provided on the flange part and on the inner periphery of the second rotary disc is inclined relative to a radial direction so as to produce a reaction with a radial component and with a tangential component.

7. The multiple disc brake according to claim 5, characterized in that the compensating spring is a leaf spring bent in the form of a U and equipped with two substantially semi-cylindrical retaining lugs turned down perpendicularly relative to the spring and accommodated, during operation, in substantially semi-cylindrical receptacles formed on a side of the supporting surface of the flange part.

* * * * *